United States Patent [19]

Deutsch

[11] Patent Number: 4,888,940
[45] Date of Patent: Dec. 26, 1989

[54] METHOD AND APPARATUS FOR COMPACTING COTTON WITHIN A COTTON HARVESTER BASKET

[75] Inventor: Timothy A. Deutsch, Newton, Iowa

[73] Assignee: Deere & Company, Moline, Ill.

[21] Appl. No.: 302,648

[22] Filed: Jan. 27, 1989

[51] Int. Cl.⁴ .......................... A01D 46/22; B60P 1/42
[52] U.S. Cl. .......................................... 56/16.6; 56/28; 56/344; 414/526
[58] Field of Search .................. 56/16.6, 28, 30, 344, 56/345; 460/8, 114; 414/526, 300

[56] References Cited

U.S. PATENT DOCUMENTS

| 2,746,621 | 5/1956 | McIntyre | 414/526 |
| 3,922,838 | 12/1975 | Kline | 56/344 |
| 4,553,378 | 11/1985 | Fachini et al. | 56/16.6 |

FOREIGN PATENT DOCUMENTS

| 735209 | 6/1980 | U.S.S.R. | 56/28 |
| 1039456 | 9/1983 | U.S.S.R. | 56/28 |

Primary Examiner—Stephen J. Novosad
Assistant Examiner—David J. Bagnell

[57] ABSTRACT

Hydraulically driven compacting augers are supported within a cotton basket and are connected for operation to a hydraulic source through a remotely actuatable reversing valve. The augers are rotated a first direction to compress the cotton toward the front of the basket as the air duct system blows the cotton rearwardly into the basket. After the cotton is compacted toward the front of the basket, the reversing valve is actuated to cause the augers to rotate in the opposite direction and compress the cotton toward the rear of the basket. The augers additionally serve to help meter the cotton from the basket during dumping and are reversible during dumping.

19 Claims, 3 Drawing Sheets

METHOD AND APPARATUS FOR COMPACTING COTTON WITHIN A COTTON HARVESTER BASKET

BACKGROUND OF THE INVENTION

The present invention relates generally to cotton harvesters, and more specifically to compactor structure for compacting harvested cotton within the harvester basket to increase basket capacity without increasing basket size.

Various compacting structures have been used to compress relatively light and fluffy cotton into a basket to increase the maximum capacity of the basket. Typically, compacting augers have been supported in the basket to direct the cotton rearwardly and compress the cotton against the back of the basket. Although the augers have significantly increased the amount of cotton which can be held in the basket, the cotton is compressed more densely in the rear of the basket than in the front. At times, the augers will stall out and no more cotton will fit in the basket. The basket then contains dense cotton in the rear and non-compacted less dense cotton in the front. Therefore, the capacity of the basket is not optimized, and the dumping characteristics of the cotton from the front to the rear of the basket differ because of the difference in the densities. Since the maximum capacity of the basket is reduced by uneven compacting, the basket must be dumped more frequently which results in reduced productivity of the cotton harvester.

BRIEF SUMMARY OF THE INVENTION

It is therefore an object of the present invention to provide an improved compacting auger structure for a cotton harvester basket. It is a further object to provide such a structure which overcomes the aforementioned problems. It is still another object to provide an improved method for filling a cotton basket on a cotton harvester which increases the capacity of the basket.

It is another object of the present invention to provide an improved compacting auger structure for a cotton harvester which increases the maximum capacity of the basket. It is another object to provide such a structure which provides more uniform compacting of the cotton from the front to the rear of the basket than previously available compacting structures.

It is still a further object of the present invention to provide compacting structure for a cotton harvester basket which initially moves rearwardly blown cotton toward the front of the basket and compresses the cotton in the front of the basket, and thereafter moves the cotton rearwardly to compress the cotton near the rear of the basket.

It is another object of the present invention to provide an improved compacting auger structure for a cotton harvester basket which includes reversing structure for changing the rotational direction of the augers on-the-go from the harvester cab to allow for more uniform compacting, front to rear, in the basket. It is another object to provide such structure which is relatively simple and low in cost for increasing basket capacity without increasing basket size.

It is still a further object of the present invention to provide an improved control arrangement for the compacting augers on a cotton harvester basket. It is a further object to provide such a structure which permits the rotational direction of the augers to be changed on the go by a control in the harvester cab.

In accordance with the above objects, a cotton harvester basket is provided with compacting augers which extend in the fore-and-aft direction above the floor of the basket. Rather than driving the augers in a conventional manner to move the cotton rearwardly and compress the cotton against the back wall of the basket, the augers are initially driven by reversible hydraulic motors to move the cotton blown rearwardly into the basket from the ducts toward the front wall of the basket. Once the cotton is compacted in the front of the basket, an electric solenoid valve controlled by a switch in the cab is activated to change the rotational direction of the augers on-the-go. The augers then compress the cotton toward the rear wall of the basket. Relatively simple and low cost structure is utilized to reverse the direction of the augers and increase basket capacity without increasing basket size. Therefore, since basket capacity is increased and the frequency of dumping is reduced, the productivity of the harvester is significantly enhanced. More uniform compacting of the cotton from the front to the rear of the basket also provides more uniform dumping of the basket. Tests have indicated that a reversible compacting auger structure increases cotton capacity of a basket by approximately fifteen percent. These and other objects, features and advantages of the present invention will become apparent to those skilled in the art from the description which follows and from the drawings.

DETAILED DESCRIPTION OF THE PREFERRED EMBODIMENT

Figure 1:
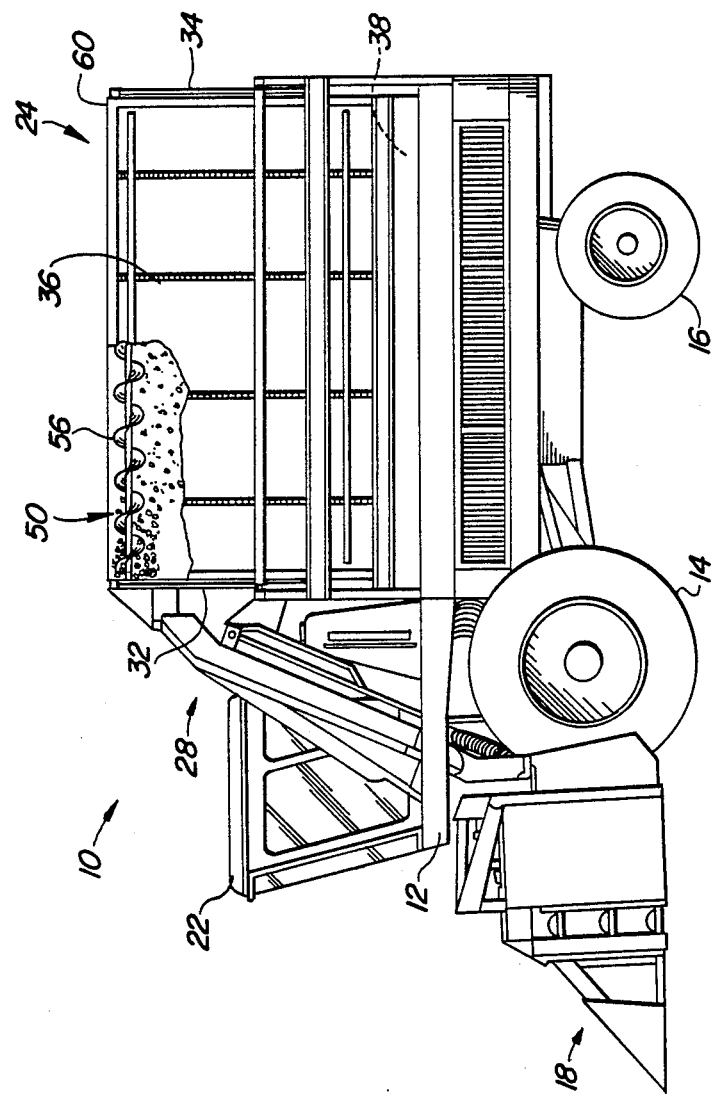
FIG. 1 is a side view of a cotton harvester with the cotton compacting augers of the present invention attached thereto.

Referring to FIG. 1, there is shown a cotton harvester 10 having a frame 12 supported for forward movement over the ground by forward drive wheels 14 and rear steerable wheels 16. A plurality of transversely spaced row units 18 are supported from the forward end of the frame 12. A cab 22 is supported rearwardly and above the row units 18, and a fore-and-aft extending cotton basket 24 is supported on the frame 12 rearwardly of the cab 22. An air duct system indicated generally at 28 extends from the row units 18 to the upper forward portion of the basket 24 and directs cotton from the row units rearwardly into the basket.

The basket 24 includes a front wall 32, a rear wall 34 and sidewalls 36 extending upwardly from a bottom floor structure 38. Lid structure indicated generally at 42 closes the basket 24 during harvesting. The entire basket 24 is rockable about a fore-and-aft extending pivotal axis 46 between a harvesting position as shown in FIG. 1 and a dump or unloading position (FIG. 2) wherein the lid structure 42 is lifted by linkages 43 to permit conveying structure 48 to completely empty the basket 24 into a trailer, module builder or the like. The cotton harvester 10 may be generally of the type shown and described in co-pending application Ser. No. 255,937 filed 11 October 1988, of common ownership with the present application and incorporated herein by reference for the purpose of background information.

Figure 2:
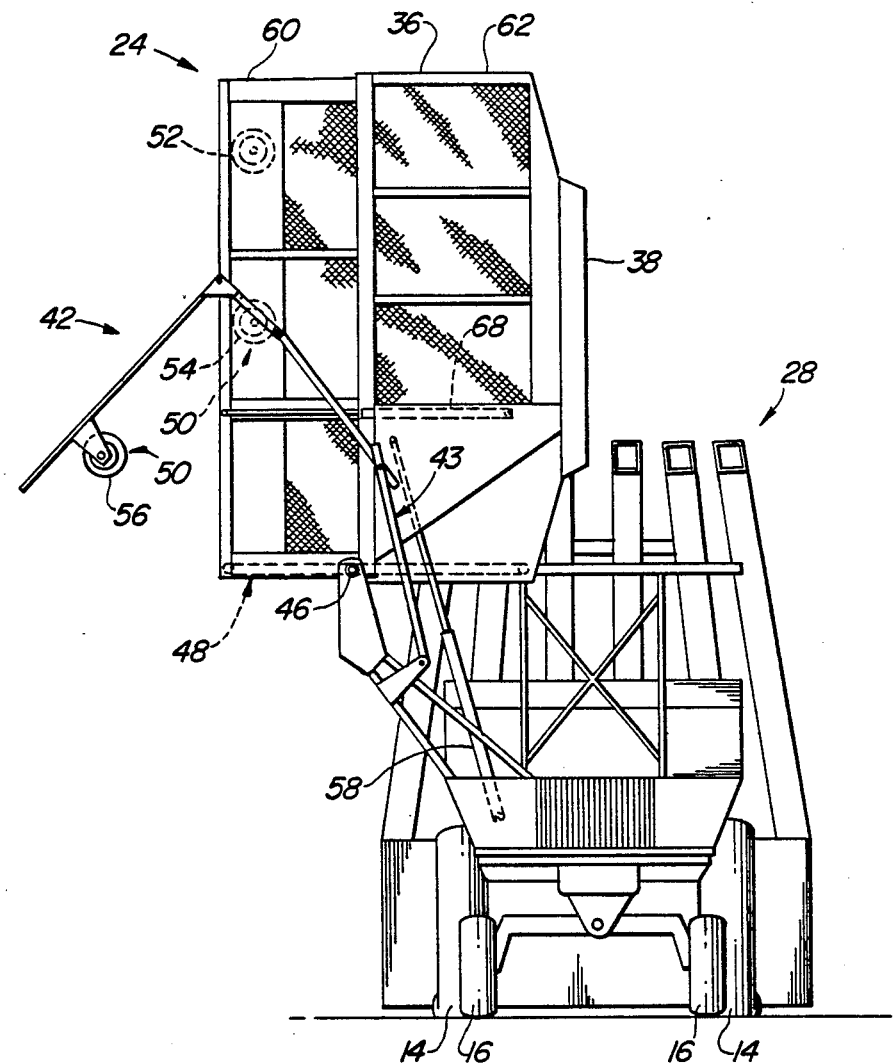
FIG. 2 is a rear view of the harvester of FIG. 1 with the basket in the dump position.

To increase basket capacity without increasing basket size, cotton compacting structure indicated generally at 50 is provided. The cotton compacting structure 50 includes augers 52, 54 and 56 supported within he basket above the floor structure 38 and below the lid structure 42 for rotation about parallel fore-and-aft extending axes. Preferably, as shown and described in the aforementioned application Ser. No. 255,937, the auger 52 is connected for movement with the basket lid 42 so that it can move away from the opening during dumping. The augers 52 and 54 also help to meter cotton from the basket during dumping. The basket 24 is movable by front and rear hydraulic basket dump cylinders 58 between a field-working position (FIG. 1) and a raised dump position (FIG. 2). The basket 24 includes an upper basket portion 60 telescopingly received within a lower basket portion 62 and movable between a lowered transport or shipping configuration and a raised field-working position by a pair f basket telescoping cylinders '68. The conveying structure 48 includes a conveyor 72 connected for movement vertically with the upper basket portion 60 and is operable to unload cotton from the basket when the basket is in the dump position with the lid structure 42 open. The unloading conveyor 72 is driven by a hydraulic motor 74. If further details of the basket and unloading structure are desired, reference may be had to the aforementioned patent application Ser. No. 255,937.

The outboard compacting auger 52 and the central auger 54 are connected by a gear drive 78 and are driven by a hydraulic motor 84. A second hydraulic motor 88 is supported on the lid structure 42 for movement therewith and is drivingly connected to the dump side compacting auger 56. The second hydraulic motor 88 is connected in series with the first hydraulic motor 84. As cotton is being harvested and directed into the basket by the air duct system 28, the compacting structure 50 is driven by the hydraulic motors 84 and 88 to move the cotton forwardly and compress the cotton toward the forward end of the basket 24. When the cotton in the basket approaches a maximum forwardly compressed condition, which may be indicated for example by the slowing or stalling of the augers, the operator 5 reverses the direction of rotation of the augers to begin compacting the cotton toward the aft or opposite end of the basket until the maximum capacity of the basket is reached.

Figure 3:
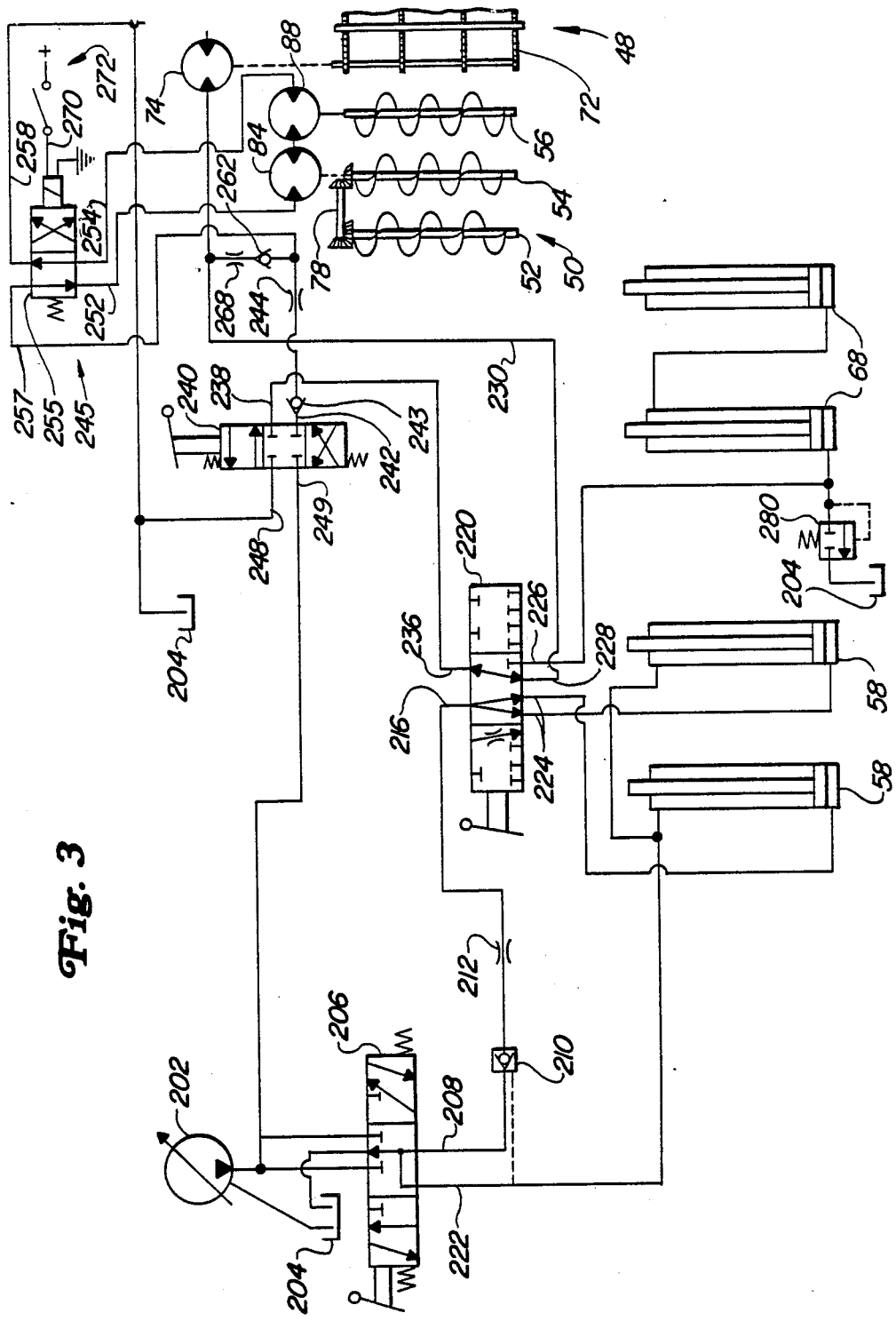
FIG. 3 is a schematic representation of the hydraulic circuitry for the harvester.

Referring now to FIG. 3, the hydraulic circuit for operating the compacting structure 50, the cylinders 58 and 68, and the unloading conveyor 72 will be discussed in detail. A source of hydraulic fluid under pressure 202 and a reservoir 204 are located on the cotton harvester 10 and are connected in a conventional manner to an operator control valve 206 located in the harvester cab 22. The operator control valve 206 includes a first output port 208 connected through a pilot operated check valve 210 and a flow restrictor 212 to a first input port 216 on a rotary diverter/lock valve 220. The operator control valve 206 includes a second output port 222 connected to the rod ends of the basket lift cylinders 58. The valve 220 includes first and second output ports 224 connected to the base ends of the cylinders 58. A third output port 226 of the valve 220 is connected to the base end of one of the basket telescoping cylinders 68. The rod end of the same cylinder 68 is connected to the base end of the second cylinder 68 so that the cylinders 68 operate together in series. A fourth output port 228 of the valve 220 is connected by a flexible conduit 230 to the hydraulic conveyor motor 74. The rotary valve 220 also includes a second input port 236 which is connected to a first port 238 of a compactor-conveyor motor control valve 240. The valve 240 includes a second port 242 connected through a check valve 243 and a flow restrictor 244 to auger reversing control structure 245, which in turn is connected to the hydraulic motors 84 and 88. The valve 240 includes a third port 248 connected to the reservoir 204. A fourth port 249 is connected to the source of fluid under pressure 202. The hydraulic motor 88 driving the compacting auger 56 is connected in series with the motor 84 driving the augers 52 and 54. The auger reversing control structure 245 is connected to the motors 84 and 88 via lines 252 and 254. The auger reversing control structure 245 includes a reversing valve 255 having outputs connected to the lines 252 and 254 and inputs connected to lines 257 and 258. The line 257 is connected to the restrictor 244. A one-way check valve 262 is connected in series with a flow restrictor 268 between the line 230 and the line 257.

The diverter/lock valve 220 permits the operation of the basket lift cylinders 58 from the operator control valve 206, as well as operation of the telescoping cylinders 68 from the valve 240. When the valve 220 is moved to the left-most position as viewed in FIG. 3, all the cylinders are locked against operation. When the valve 22 is in the position shown in FIG. 3, the operator control valve 206 controls the basket lift cylinders 58, and fluid flow between the fourth output port 228 and the second input port 236 of the valve 220 is facilitated. To move the basket 24 to the dump position, the operator moves the control valve 206 to the left to direct fluid flow to the port 208, through the check valve 210 and the restrictor 212 and to the output ports 224 to extend the cylinders 58. At the same time, the output port 226 is blocked so that the hydraulic basket telescoping cylinders 68 cannot be operated. With the rotary valve 220 in the position shown in FIG. 3, the operator may also move the valve 240 upwardly from the closed position shown to pressurize the port 238 and direct fluid under pressure through the input port 236 and output port 228 of the valve 220 to the conveyor motor 74 to drive the discharge conveyor 72. The check valves 262 and 243 divert some of the fluid flow from the line 230 through the valve 255 and the auger motors 84 and 88 to slowly rotate the augers 52, 54 and 56 during dumping to facilitate uniform discharge of the cotton from the basket.

To move the basket 24 from the dump position back into the harvest position, the rotary valve 220 is positioned as shown in FIG. 3, and the operator control valve 206 is moved to the rightmost position to pressurize the port 222 and return the port 208 to reservoir. The check valve 210 is opened to permit the cylinders 58 to retract. The restrictor 212 controls the rate at which the basket will pivot back towards the field-working position.

As cotton is being harvested and directed rearwardly by the air duct system 28 through the front, upper portion of the basket 24, the operator moves the valve 240 to the lowermost position as viewed in FIG. 3 to direct fluid flow from the port 252 through the compactor auger motors 84 and 88 to rotate the augers and compress the cotton within the basket. With the reversing valve 255 in the normal operating position as shown in FIG. 3, fluid under pressure is directed from the line 257 to the line 252 to drive the motors 84 and 88 to rotate the augers 52, 54 and 56 such that the auger flighting moves the cotton toward the forward or entrance wall of the basket 24. Fluid under pressure moves from the line 252 first into the motor 84 and then into the motor 88 and out through the lines 254 and 258 to reservoir. When the desired state of cotton compaction is reached toward the forward end of the basket 24, the operator moves the reversing valve 256 to the left-most position as shown in FIG. 3 to reverse the flow of hydraulic fluid through the motors 84 and 88 which causes the augers to rotate in the reverse direction. Cotton is then compacted toward the rear of the basket. Preferably, the reversing valve 255 is an electrohydraulic valve located adjacent the basket near the motors 84 and 88 and connected by a line 270 to an operator control switch 272 located on the instrument panel in the cab 22. The input terminal of the switch 272 is connected to the vehicle battery. The switch 272 is normally maintained in the open position so that the valve 255 is positioned as shown in FIG. 3. To reverse the direction of auger rotation, the operator simply closes the switch 272 which causes the valve 255 to move to the left-most position. Therefore, the auger rotation may be changed at any time quickly and easily from the cab 22 to enhance basket capacity or to help meter cotton more uniformly during dumping.

As can be appreciated from FIG. 3, the rotary valve 220 prevents operation of the unloading conveyor 72 unless the dump function is selected by positioning the valve 220 in the central position as shown in FIG. 3. During dumping of the basket 24, the augers 52, 54 and 56 will rotate to facilitate metering of the cotton from the basket onto the discharge conveyor 72. The reversing valve 56 may also be utilized to reverse the rotation of the augers during dumping to help meter cotton more uniformly. For example, the auger rotation can be controlled so that if a large clump exists on one side of the lid opening, the clump can be broken up and directed toward the opposite side of the opening.

To operate the hydraulic basket telescoping cylinders 68, the rotary valve 220 is positioned in the right-most position so that the output port 228 is connected with the input port 236. The operator valve 240 is then moved to pressurize the line 208 from the port 252 and direct fluid through the valve 220 into the base end of the first cylinder 68. As the first cylinder 68 extends, oil is forced from the rod end thereof into the base end of the second cylinder 68 to raise the upper basket portion 60. To lower the upper basket portion 60, the valve 220 is moved to the right-most position as viewed in FIG. 3. The valve 240 is then moved down to open the port 238 to reservoir through the port 248. When the valve 220 is in the right-most position as viewed in FIG. 3, fluid flow is blocked to the basket lift cylinders and to the hydraulic conveyor motor 74. A pressure relief valve 280 is connected between the first cylinder 32 and the reservoir to prevent excessive pressure in the telescoping circuit.

Having described the preferred embodiment, it will be apparent that modifications can be made without departing from the scope of the invention as defined in the accompanying claims.

I claim:

1. In a cotton harvester having an unloadable cotton basket with opposed walls extending upwardly from a floor, cotton conveying duct structure including an outlet for directing harvested cotton in a preselected direction into the basket, compactor structure comprising:
   an auger located above the floor;
   means for rotating the auger to push the cotton toward one of the walls; and
   means for reversing the rotational direction of the auger on-the-go to push the cotton toward the wall opposite said one of the walls.

2. The invention as set forth in claim 1 wherein said one of the walls is located adjacent the duct structure outlet.

3. The invention as set forth in claim 1 wherein the means for rotating the auger includes a reversible hydraulic motor and the means for reversing includes valve means connected to the motor.

4. The invention as set forth in claim 3 wherein the valve means comprises a remotely operable hydraulic valve.

5. The invention as set forth in claim 4 wherein the remotely operable hydraulic valve comprises a two position reversing valve.

6. The invention as set forth in claim 1 wherein the means for rotating the auger includes means for rotating the auger during unloading of the basket, and wherein the means for reversing the auger is operable to reverse the direction of rotation of the auger during unloading of the basket.

7. In a cotton harvester having an unloadable basket with opposed sidewalls including first and second opposed walls extending upwardly from a floor, a cotton conveying duct opening toward the second wall for blowing harvested cotton toward the second wall, rotatable compacting structure extending between the first and second walls, and means for rotating the compacting structure in a first direction during initial filling of the cotton basket to move the cotton toward one of the opposed walls, and means for reversing the rotational direction of the compacting structure to urge the cotton toward the other of said opposed walls during final filling of the basket.

8. The invention as set forth in claim 7 wherein the means for rotating the compacting structure moves the cotton toward the first wall during initial filling of the basket.

9. The invention as set forth in claim 8 wherein the rotatable compacting structure comprises a plurality of rotatable augers located near the top of the basket.

10. The invention as set forth in claim 9 wherein the axis of rotation of the augers is generally parallel to the direction of the blown harvested cotton.

11. The invention as set forth in claim 9 wherein at least one of the augers comprises a metering auger, and the means for reversing is operable for reversing the metering auger during unloading of the cotton harvester basket.

12. The invention as set forth in claim 11 wherein the basket includes a lid structure movable between an open and a closed position, and the metering auger is connected to the lid structure for movement therewith.

13. The invention as set forth in claim 12 wherein the basket includes an unloading conveyor, said conveyor located below the metering auger when the lid structure is in the open position.

14. The invention as set forth in claim 13 including hydraulic drive means operably connected to the unloading conveyor and means connecting the hydraulic drive means and the hydraulic motor for simultaneous operation.

15. The invention as set forth in claim 7 wherein the means for rotating the compacting structure comprises a reversible hydraulic motor, and the means for reversing the compacting structure comprises a hydraulic reversing valve.

16. The invention as set forth in claim 15 wherein the reversing valve comprises a solenoid-operated valve, said means for reversing further comprising an electric switch remotely located from and operably connected to the solenoid.

17. A method of filling a cotton basket on a cotton harvester, including the steps of:
 (a) blowing the cotton in a preselected direction into the basket;
 (b) rotating a compacting auger in the basket to move the cotton in a direction opposite the preselected direction until the cotton is substantially compacted in said direction opposite the preselected direction; and
 (c) after step (b), reversing the direction of rotation of the compacting auger to compress the cotton in the preselected direction.

18. The method as set forth in claim 17 wherein the step of rotating a compacting auger includes driving a hydraulic motor through a selectively repositionable reversing valve connected to a source of hydraulic pressure on the harvester and wherein the step of reversing includes repositioning the reversing valve.

19. The method as set forth in claim 17 further including the steps of providing a movable closure on the basket and supporting the compacting auger on the movable closure for movement therewith between an open unloading position and a closed filling position.

* * * * *